April 29, 1958  H. JASIK  2,832,955
ANTENNA SYSTEM

Filed March 24, 1953  4 Sheets-Sheet 1

INVENTOR.
HENRY JASIK
BY
Leonard H. King
AGENT

April 29, 1958     H. JASIK     2,832,955
ANTENNA SYSTEM

Filed March 24, 1953     4 Sheets-Sheet 3

INVENTOR.
HENRY JASIK
BY
Leonard H. King
AGENT

April 29, 1958     H. JASIK     2,832,955
ANTENNA SYSTEM

Filed March 24, 1953     4 Sheets-Sheet 4

*INVENTOR.*
HENRY JASIK

BY Leonard H. King

AGENT

United States Patent Office 2,832,955
Patented Apr. 29, 1958

2,832,955

ANTENNA SYSTEM

Henry Jasik, Flushing, N. Y.

Application March 24, 1953, Serial No. 344,413

13 Claims. (Cl. 343—776)

This invention relates to antennas and, in particular, to antennas suitable for use in omnidirectional radio range navigational systems.

The aircraft navigation system presently operated by the United States Government, commonly known as an omnirange, employs five radiating elements in the antenna system. Four elements are positioned so that they form the corners of a square while a fifth element is in the center.

A modulated signal in the 100 mc. region of the radio spectrum, having a 30 C. P. S. frequency modulated component, is transmitted by the center antenna in an omnidirectional pattern. The corner antennas are operated in diagonal pairs, each antenna being fed a signal 180° out of phase with its mate so that two figure-of-eight patterns result.

A signal having a 30 C. P. S. amplitude modulation component is fed to one diagonal pair. A second signal having the same 30 C. P. S. amplitude modulation but 90° out of phase with the first is fed the other diagonal pair.

A radio receiver aboard an aircraft receives the omnidirectional signal, and detects the 30 C. P. S. frequency modulated component signal which is then used as a reference. This is compared with the 30 C. P. S. signal component present in the figure-of-eight pattern. The difference in phase between the two audio signals serves as an indication of aircraft position with respect to the omnirange transmitter. The phase difference is normally displayed on the aircraft's instrument panel in terms of course deviation.

In the omnirange, the omnidirectional antenna radiates both the reference phase signal, which is frequency modulated, and an amplitude modulated, voice or code, station identifying signal.

The antenna is a critical and important element of an omnirange system. Characteristics of a good antenna include low polarization error, small cone of confusion, high efficiency, low error in transmitted bearing angle, better than average operational reliability with low maintenance requirements and low manufacturing cost.

One of the principal sources of bearing error is a result of cross-polarized radiation from the two figure-of-eight patterns. Such cross-polarization is minimized by the antenna of this invention.

It is an object of this invention to provide an antenna capable of transmitting a figure-of-eight pattern.

It is still another object to provide an antenna capable of transmitting a crossed pair of separate figure-of-eight patterns.

An object of this invention is to provide an antenna suitable for the radiation of horizontally polarized radio waves.

A still different object is to provide a compact antenna capable of simultaneously transmitting a crossed pair of figure-of-eight patterns and an omnidirectional signal.

A particular object of this invention is to provide an omnirange antenna.

Another particular object of this invention is to provide an improved broadcast antenna.

A still another particular object of this invention is to provide an improved omnirange system.

A further object is to provide antennas of the described type which are simple and rugged in structure while providing efficient operation.

The manner of obtaining these and other objects and advantages is more fully disclosed in the following detailed description taken in conjunction with the accompanying drawings.

Figure 1:
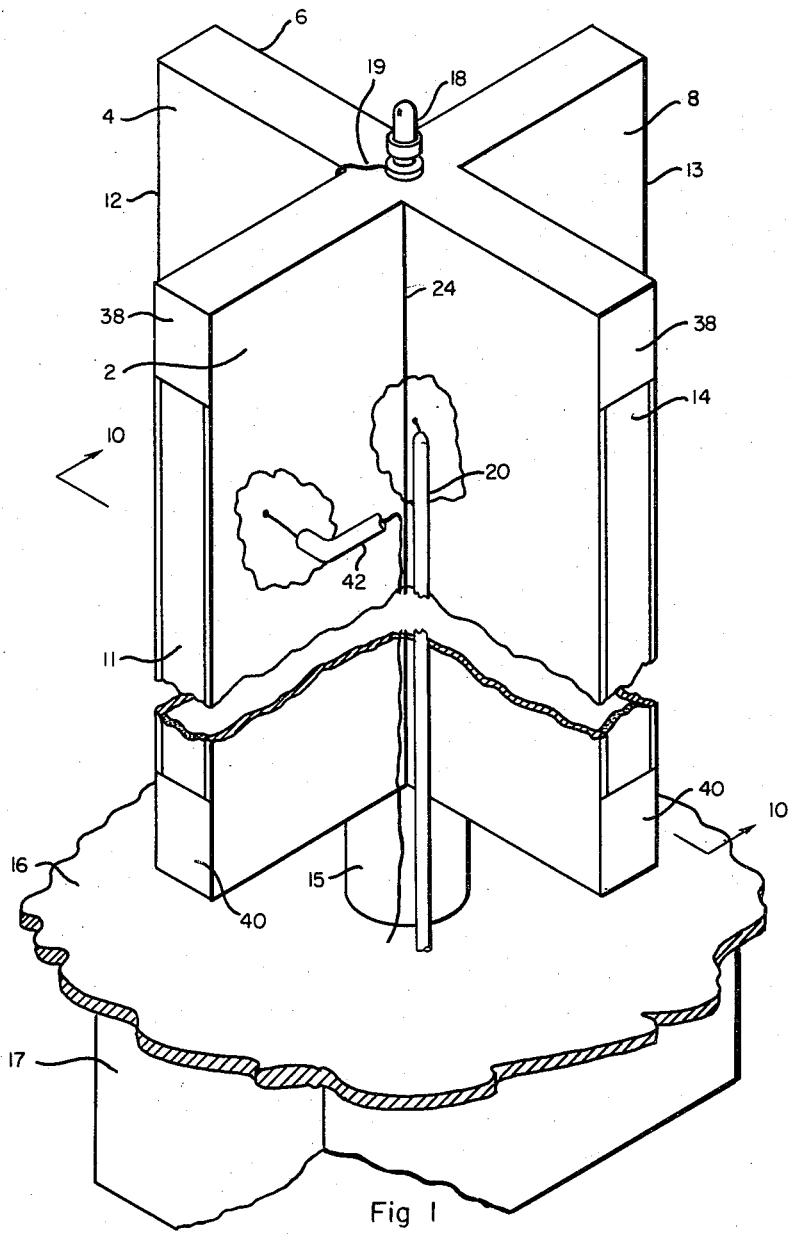
Figure 1 is a perspective view of the antenna of this invention.
Figure 5:
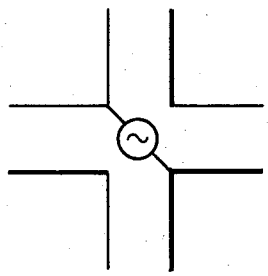
Figure 5 shows a different mode of excitation applied to the antenna of Figure 2.
Figure 6:
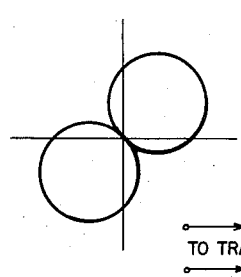
Figure 7:
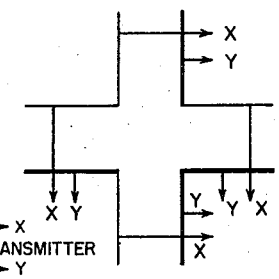
Figure 8:
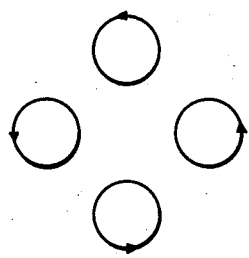
Figure 9:
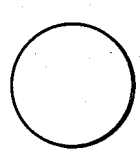
Figure 10:
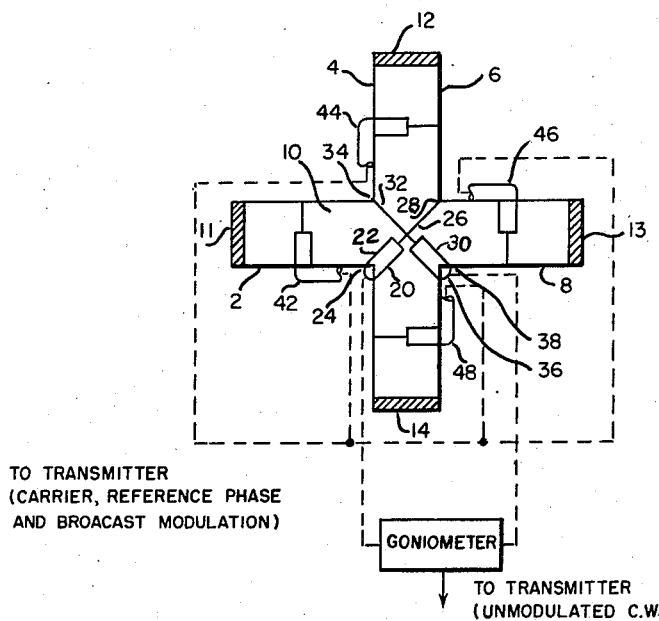
Figures 11, 12:
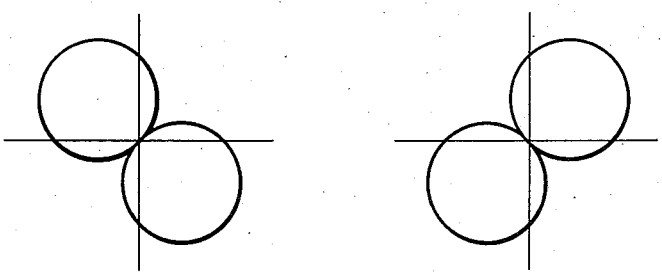
Figure 13:
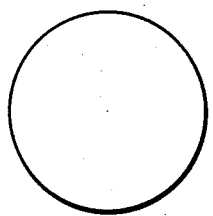
Figure 14:
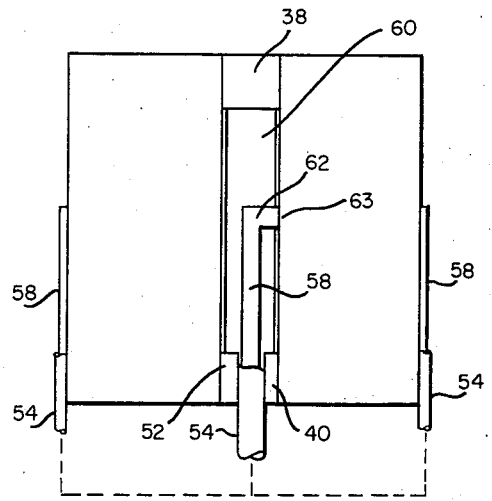
Figure 15:
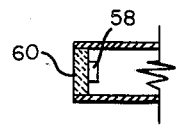
Figure 16:
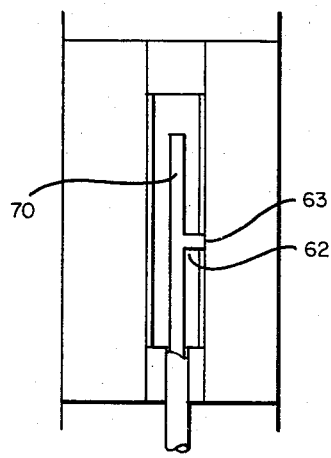
Figure 17:
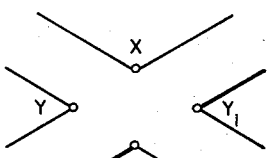
Figure 18:
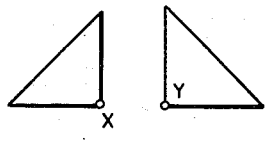
Figure 19:
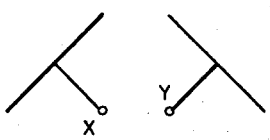
Figure 20:
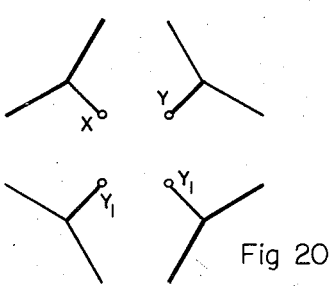

Figure 6 presents a polar plot of the reduction pattern produced by the excitation shown in Figure 5;

Figure 7 shows the antenna fed by four parallel lines;

Figure 8 presents the equivalent electric current loops which would radiate essentially the same electromagnetic fields as that generated by the antenna feed of Figure 7;

Figure 9 is the radiation pattern produced by the loops of Figure 8;

Figure 10 is a cross-section view of the antenna of Figure 1 taken in plane 10—10;

Figure 11 is a polar plot of a figure-of-eight pattern radiated by the antenna of this pattern;

Figure 12 is a polar plot of a figure-of-eight pattern radiated by a differently energized antenna of this invention;

Figure 13 is a polar plot of the omnidirectional antenna of this invention;

Figure 14 is a plan view of the antenna of this invention;

Figure 15 is a cross-sectional view of a portion of the antenna of Figure 1 showing a different structural arrangement;

Figure 16 is a plan view of the antenna showing a tuning stub;

Figure 17 is a cross-sectional view of an alternate physical configuration for this antenna;

Figure 18 shows in cross-section still another structural arrangement of the antenna of this invention utilizing triangular members;

Figure 19 shows a structure in cross-section using a T structural member;

Figure 20 shows a modified T structure in cross section.

In the drawings, like numbers refer to like items.

Briefly described, this invention comprises an antenna formed of four angle elements arranged so as to provide four radiating slots backed by four cavities having a common portion. The four slots are fed in a novel manner to provide both omnidirectional and figure-of-eight patterns simultaneously without mutual interference.

In Figure 1, there is shown a preferred embodiment of the antenna of this invention which consists of angle members 2, 4, 6 and 8 arranged to form a cross-shaped cavity 10 backing slots 11, 12, 13 and 14. The antenna may be mounted on a round steel pipe 15, the other end of the pipe being supported in a concrete foundation buried in the ground. A counterpoise 16 comprising a conductive sheet is supported on the roof of the transmitter building 17. The counterpoise may be between 8′ and 30′ in diameter and, while not essential to the operation of the antenna, its use results in a clean cone of confusion.

It is preferred that the center of the slot be about $0.4\lambda$ to $0.7\lambda$ above the counterpoise. $\lambda$ is the free-space wavelength.

An electrically energized aircraft warning light 18 may be situated on top of the antenna. Power for the light may be supplied by cable 19 located in the corner of the angle where it does not have any effect on the radiation pattern of the antenna.

Figure 2:
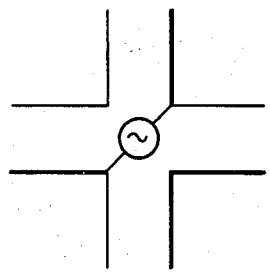
Figure 2 is a simple pictorial cross-sectional view of the antenna.
Figure 3:
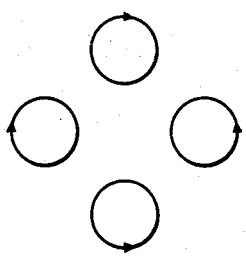
Figure 3 is a presentation of the equivalent electric current loops which would radiate essentially the same electromagnetic field as that produced by the excitation shown in Figure 2.
Figure 4:
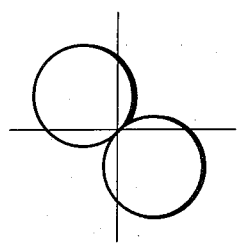
Figure 4 is a polar plot of the pattern produced by the loops shown in Figure 3.

A simple cross-sectional view of the antenna is shown in Figure 2. There are three different ways in which the slots can be fed in order to obtain the desired patterns. Each slot will radiate a pattern which is essentially the same as that of a small horizontal current loop. If a voltage is excited by means of a coaxial line, as shown in Figure 2, then all four slots will be excited. The radiation pattern of the four slots will then be the same as that of the four loops shown in Figure 3. The pattern radiated by this configuration will be substantially a figure-of-eight patterns oriented as shown in Figure 4.

If a voltage is excited by means of a coaxial line, as shown in Figure 5, then the radiation pattern will be as shown in Figure 6. It will be noted that the two figure-of-eight patterns are at right angles to one another so that these patterns are suitable for use in the omnirange system.

If the four slots are fed in parallel by means of four feeders branching from a singly main feeder as shown in Figure 7, the radiation pattern will be substantially the same as that produced by the four loops shown in Figure 8. The radiation pattern of this configuration will essentially be omnidirectional, as in Figure 9, and will be suitable for the radiation pattern on which the reference phase and the broadcast modulation is transmitted.

A more detailed presentation of the antenna and feed system is shown in Figure 10 which is a section taken through the antenna shown in Figure 1.

Coaxial line 20 provides outer conductor 22 connected at corner 24 of angle 2 and an inner conductor 26 electrically connected to corner 28 of angle 6. This provides the radiation pattern of Figure 11. Coaxial line 30, in turn, is connected across the angles 4 and 8, with inner conductor 32 connected to corner 34 of angle 4 while outer conductor 36 is connected to corner 38 of angle 8. A radiation pattern corresponding to that of Figure 12 is obtained.

The top and bottom of the cavities are shorted by conductive plates 38 and 40 so as to provide a slot having a height of between one half to one and three quarter wavelengths.

The shorted portion should be of the order of $\frac{1}{8}\lambda$ or more and serves to reduce cross-polarization due to dipole effect.

A width of 0.01 to 0.10 wavelength and a cavity length, measured from slot-to-slot, of 0.05 to 0.25 wavelength provides a suitable ratio of width to length of slot. A ratio within the range of 2:1 to 20:1 is operative.

A scale model of a typical antenna was operated successfully at 1000 mc. This antenna had a slot 5½" long by ¾₁₆" wide and measured 1⁷⁄₁₆" from slot-to-slot. The measured pattern was essentially of a cosine shape (figure-of-eight).

While the slots may be open, with respect to electrical considerations, it is preferred to utilize an electrically transparent window, such as laminated glass fiber impregnated with phenolic resin, as a cover to prevent the entrance of rain and snow and the use of the cavity as a nesting place for birds.

The same antenna may be used to provide the omnidirectional pattern of Figure 13 by feeding the four slots in parallel as shown in Figure 10. Coaxial lines 42, 44, 46 and 48 are connected so as to feed the cavities behind slots 11, 12, 13 and 14 respectively. It is preferable that the connection be made at a point in the cavity providing optimum matching between the line and the slot.

In Figure 14, another embodiment of this invention is disclosed in each of the four feeders, which feed the four slots in parallel, consists of an outer conductor 54 terminated at the end of the slot at 52, whereas inner conductor 58 is terminated in a conductive strip, which may be either round or flat. The strip may be fastened to the outer surface of the insulating plastic 60 or to the inner surface as shown in Figure 15. A stub 62 connects conductor 58 to the edge of the slot at 63 so as to excite the slot. It is to be noted that this construction, while extremely rugged, may be accomplished by quite inexpensive and simple fastening means.

A stub portion 70, shown in Figure 16, may be provided for purposes of matching or electrical balance. While shown as a simple stub, in particular cases, the stub portion may be terminated at the edge of the slot.

As specifically pointed out earlier, the antenna of this invention may be excited so as to provide two figure-of-eight patterns and an omnidirectional pattern which do not interfere one with the other. It has also been shown that the four slots and their respective cavities may be excited so as to provide an omnidirectional pattern in several ways. Other methods of excitation may, under some circumstances, be used advantageously in combination with the figure-of-eight patterns provided by this antenna.

It should be noted that the antenna of this invention may be used advantageously for frequency modulation and television broadcasting. In broadcasting applications, the antenna is normally located in a position high above the ground; thus its relatively small size and high radiation characteristics are of considerable merit. Further, the simple rugged construction which avoids the use of frequently troublesome insulators requires little maintenance which is important if the unit is located in a high, relatively inaccessible place such as a mast on top of a high building.

In some applications, the figure-of-eight pattern may be combined with the omnidirectional pattern to provide a modification of pattern shape to adjust area coverage to conform with regional population distribution.

A number of antenna sections may be stacked one above the other to provide greater power handling capacity or multiple frequency transmission as when one tower in an urban location is used for all the local television stations.

The symmetry of the feeds provides an important asset in that cross-coupling is reduced to a suitably low value. For example, the figure-of-eight signal induces equal and opposite currents in the omnidirectional feeders which then cancel out at the junction of the omnidirectional feeders so no current flows past that point. Conversely, no current is induced in the figure-of-eight feeder by the omnidirectional feeders. Further, by virtue of the right angle relationship between the two figure-of-eight patterns, cross-coupling is similarly eliminated. Thus, all three feeders are mutually isolated.

It is to be noted that for impedance compensation, the connection to the wall of the cavity may be made through a series impedance element.

While it is preferred that coaxial lines be used, in some applications balanced feed lines may be used to excite the antenna.

It is well known in the art that the characteristics of an antenna with respect to radiation are equally applicable to the reception of radio waves. Therefore, even if not specifically pointed out herein, the use of this invention for purposes of reception is intended to fall within the scope of the appended claims.

While I have described a preferred embodiment of this invention as formed from angle shaped members, I wish it to be understood that many other structural forms may be used in carrying out my invention. In Figure 17, there are shown cavities which intersect at an acute angle, which is useful if a different pattern relationship is required. In Figure 18, triangle members are used to form crossed cavities. In Figures 19 and 20, two other modifications utilizing T members are disclosed, the pairs of feed points being shown in all cases by the symbols X—X₁ and Y—Y₁. Other modifications and variations within the scope of this invention will be apparent to those skilled in the art and I wish to be limited only by the appended claims.

What I claim as new is:

1. A radio wave transmission system comprising: four radiating elements, each in the form of a tubular electroconductive member having dimensions in a plane lying traversely of said member, which in one direction are small compared with those in a direction perpendicular thereto; said radiating elements being radially arranged about an axis with the larger of said dimensions being parallel to said axis; said radiating elements being energized by a transmission line having a first and a second conductor, said first conductor being connected to a point common to two of said radiating elements and said second conductor being connected to a point common to the other two of said radiating elements.

2. A radio wave transmission system comprising four radiating elements, each in the form of a tubular electroconductive member having dimensions in a plane lying traversely of said member which in one direction are small compared with those in a direction perpendicular thereto; said radiating elements being radially arranged about an axis with the larger of said dimensions being parallel to said axis; said radiating elements being energized by a transmission line having a first and a second conductor; said first conductor being connected to a point common to two of said radiating elements and said second conductor being connected to a point common to the other two of said radiating elements; a second transmission line having a third and a fourth conductor; said third conductor being connected to a point common to one of said two of said radiating elements and to one of the said other two of said radiating elements; and the said fourth conductor being connected to a point common to the other one of said two of said radiating elements.

3. A radio wave transmission system comprising four radiating elements, each in the form of a tubular electroconductive member having dimensions in a plane lying traversely of said member which in one direction are small compared with those in a direction perpendicular thereto; said radiating elements being radially arranged about an axis with the larger of said dimensions being parallel to said axis; said radiating elements being energized by a transmission line having a first and a second conductor; said first conductor being connected to a point common to two of said radiating elements and said second conductor being connected to a point common to the other two of said radiating elements; a second transmission line having a third and a fourth conductor; said third conductor being connected to a point common to one of said two of said radiating elements and to one of the said other two of said radiating elements and the said fourth conductor being connected to a point common to the other one of said two of said radiating elements and to the other one of the said other two of said radiating elements; four transmission lines connected in parallel, one of each of said transmission lines being connected across the smaller dimension of one of each of said radiating elements so that the wave resulting from the energizing of said four parallel transmission line is radiated substantially uniformly in all directions in a plane.

4. A radio wave transmission system comprising four radiating elements, each in the form of a tubular electroconductive member having dimensions in a plane lying traversely of said member which in one direction are small compared with those in a direction perpendicular thereto; said radiating elements being radially arranged about an axis with the larger of said dimensions being parallel to said axis; said radiating elements being energized by a transmission line having a first and a second conductor; said first conductor being connected to a point common to two of said radiating elements and said second conductor being connected to a point common to the other two of said radiating elements; a second transmission line having a third and a fourth conductor; said third conductor being connected to a point common to one of said two of said radiating elements and to one of the said other two of said radiating elements and the said fourth conductor being connected to a point common to the other of said two of said radiating elements and to the other one of the said other two of said radiating elements; four coaxial transmission lines having an inner and an outer conductor, one of the said inner conductors being connected at substantially the center of the said larger dimension of each of said radiating elements, the said outer conductors being connected to a point on each of said radiating elements substantially spaced from the said point of connection of said inner conductor.

5. A radio transmission system comprising four electroconductive angular members; electroconductive members arranged to cover the top and bottom of said angular members so as to form four intersecting rectangular tubular members; a transmission line having a first and a second conductor; said first conductor being connected to a portion of one of said angular members common to two of said tubular members; said second conductor being connected to a portion of one of said angular members common to the other two of said tubular members.

6. A radio transmission system comprising four rectangular tubular members intersecting to form a cross-shaped cavity; a transmission line having a first and a second conductor; said first conductor being connected to a portion of said system common to two of said rectangular members; said second conductor being connected to a portion of said system common to the other two of said rectangular members.

7. An antenna comprising four spaced T-shaped electroconductive elements so arranged that the upright bar of the elements are radially positioned about an axis; means to electrically short said elements being provided in planes traversing the top and bottom of said elements; a coaxial transmission line having an inner and an outer conductor, said inner conductor being electrically connected to a first of said radially arranged elements and said outer conductor being connected to the radially arranged element opposite said first radially arranged element.

8. An antenna system for radiating signals comprising four electroconductive angle members arranged to provide a cross-shaped cavity terminating in slots; an electroconductive base element electrically connecting one end of said four angle members, an electroconductive cover means electrically connecting the other end of said angle members; electroconductive means covering a portion of said slots and connected to said base element; an electroconductive means partially covering said slots connected to said cover means; and material transparent to electromagnetic radiations covering the slots so as to completely enclose said cavity.

9. An antenna system for radiating signals comprising four electroconductive angle members arranged to provide a cross-shaped cavity terminating in slots; an electroconductive base element electrically connecting one end of said four angle members, an electroconductive cover means electrically connecting the other end of said angle members; electroconductive means covering a portion of said slots and connected to said base element; an electroconductive means partially covering said slots connected to said cover means; and material transparent to electromagnetic radiations covering the slots so as to completely enclose said cavity; and coaxial transmission lines having inner and outer conductors serving to excite said slots; said outer conductors terminating at an edge of said slots and a portion of the said inner conductor being fastened to said transparent material and terminating at a portion of the slot spaced from the said edge of said slot at which said outer conductor is terminated.

10. A radio wave transmission system comprising: four radiating elements, each in the form of a tubular electroconductive member having dimensions in a plane lying traversely of said member, which in one direction are small compared with those in a direction perpendicular thereto; said radiating elements being radially arranged; and a transmission line having a first and a second conductor, said first conductor being connected to a point common to two of said radiating elements and said second conductor being connected to a point common to the other two of said radiating elements.

11. A radio wave transmission system comprising four radiating elements, each in the form of a tubular electroconductive member having dimensions in a plane lying traversely of said member which in one direction are small compared with those in a direction perpendicular thereto; said radiating elements being radially arranged about an axis; a first transmission line having a first and a second conductor; said first conductor being connected to a point common to two of said radiating elements and said second conductor being connected to a point common to the other two of said radiating elements; a second transmission line having a third and a fourth conductor; said third conductor being connected to a point common to one of said two of said radiating elements and to one of the said other two of said radiating elements; and the said fourth conductor being connected to a point common to the other one of said two of said radiating elements and to the other one of the said other two of said radiating elements.

12. A radio wave transmission system comprising four radiating elements, each in the form of a tubular electroconductive member having dimensions in a plane lying traversely of said member which in one direction are small compared with those in a direction perpendicular thereto; said radiating elements being radially arranged about an axis; a transmission line having a first and a second conductor; said first conductor being connected to a point common to two of said radiating elements and said second conductor being connected to a point common to the other two of said radiating elements; a second transmission line having a third and a fourth conductor; said third conductor being connected to a point common to one of said two of said radiating elements and to one of the said other two of said radiating elements and the said fourth conductor being connected to a point common to the other one of said two of said radiating elements and to the other one of the said other two of said radiating elements; four transmission lines connected in parallel, one of each of said transmission lines being connected across the smaller dimension of one of each of said radiating elements so that the wave resulting from the energizing of said four parallel transmission lines is radiated substantially uniformly in all directions in a plane.

13. A radio wave transmission system comprising four radiating elements, each in the form of a tubular electroconductive member having dimensions in a plane lying traversely of said member which in one direction are small compared with those in a direction perpendicular thereto; said radiating elements being radially arranged about an axis; a transmission line having a first and a second conductor; said first conductor being connected to a point common to two of said radiating elements and said second conductor being connected to a point common to the other two of said radiating elements; a second transmission line having a third and a fourth conductor; said third conductor being connected to a point common to one of said two of said radiating elements and to one of the said other two of said radiating elements and the said fourth conductor being connected to a point to the other of said two of said radiating elements and to the other one of the said other two of said radiating elements; four coaxial transmission lines having an inner and an outer conductor, one of the said inner conductors being connected at substantially the center of the said larger dimension of each of said radiating elements, the said outer conductors being connected to a point on each of said radiating elements substantially spaced from the said point of connection of said inner conductor.

References Cited in the file of this patent
UNITED STATES PATENTS

| | | |
|---|---|---|
| 2,459,768 | Cork | Jan. 18, 1949 |
| 2,461,005 | Southworth | Feb. 8, 1949 |
| 2,568,560 | Pauch | Sept. 18, 1951 |
| 2,648,769 | Masters | Aug. 11, 1953 |
| 2,660,674 | Brown | Nov. 24, 1953 |
| 2,746,039 | Sprague | May 15, 1956 |
| 2,751,589 | Cary | June 19, 1956 |